Nov. 22, 1955
C. E. McCOY
2,724,484
DEVICE FOR FEEDING ARTICLES
Filed Oct. 29, 1951
2 Sheets-Sheet 1
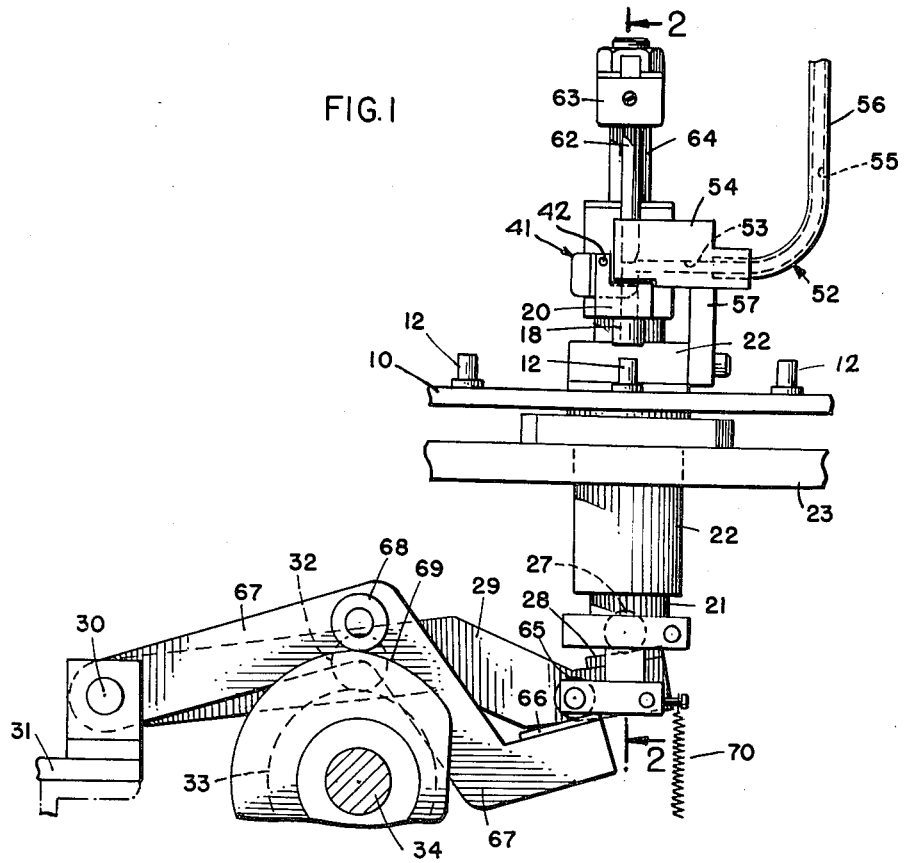
FIG.1
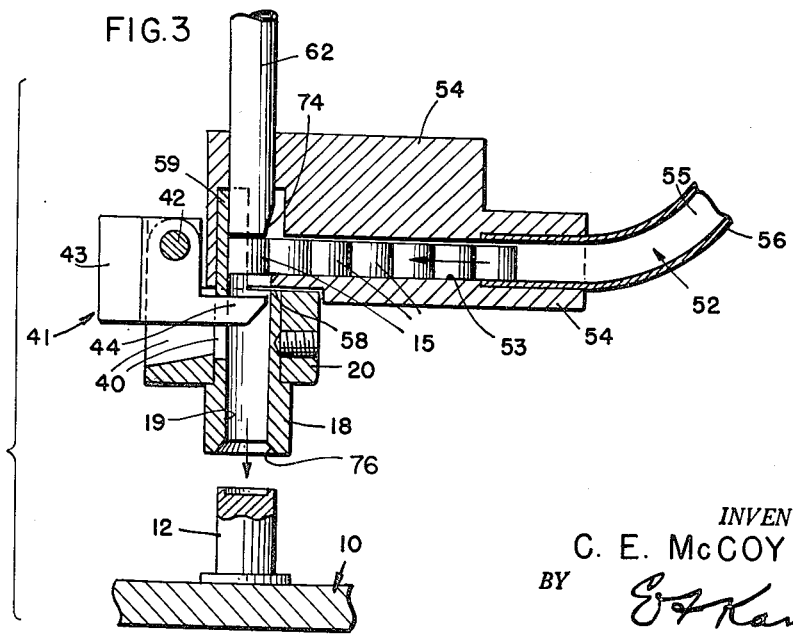
FIG.3
INVENTOR:
C. E. McCOY
BY
ATTORNEY Nov. 22, 1955　　　　　　　C. E. McCOY　　　　　　2,724,484
DEVICE FOR FEEDING ARTICLES
Filed Oct. 29, 1951　　　　　　　　　　　　　　2 Sheets-Sheet 2
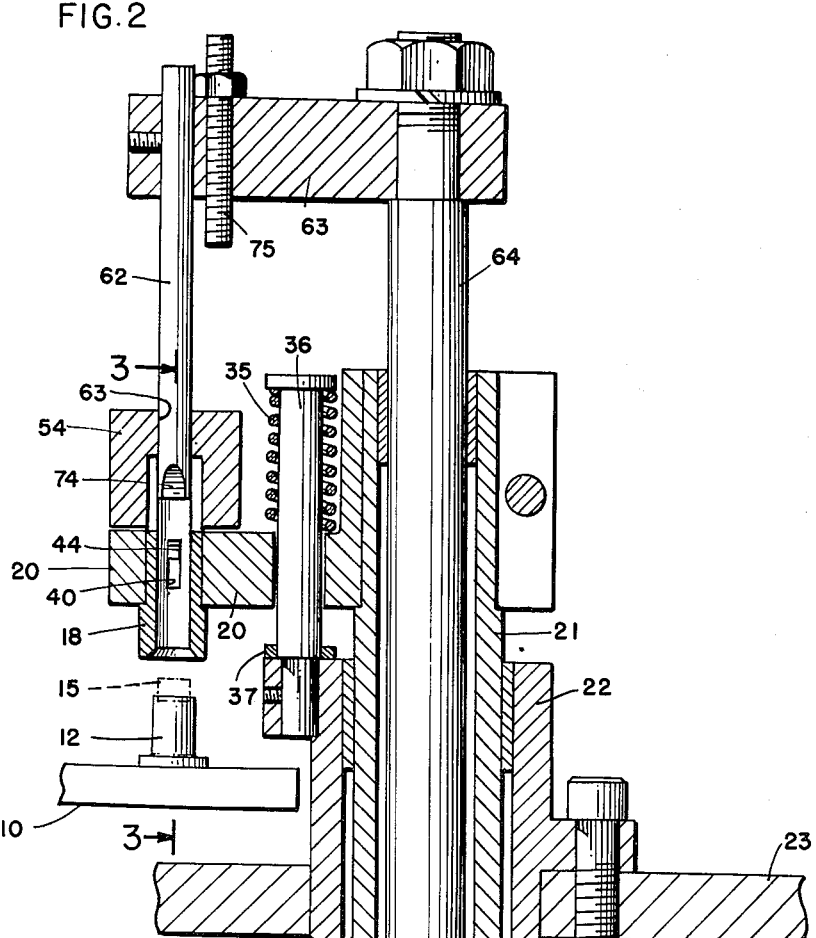
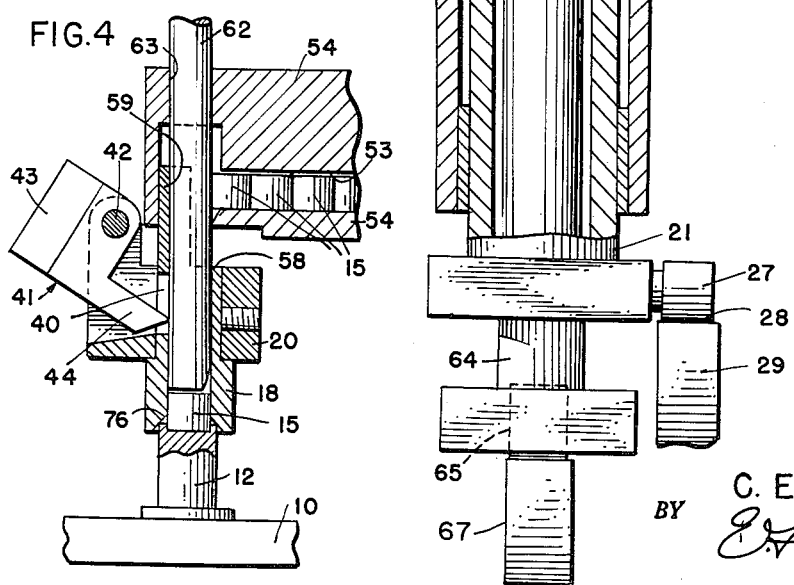
INVENTOR:
C. E. McCOY
BY
ATTORNEY

United States Patent Office 2,724,484
Patented Nov. 22, 1955

2,724,484

DEVICE FOR FEEDING ARTICLES

Clarence E. McCoy, Clarendon Hills, Ill., assignor to Western Electric Company, Incorporated, New York, N. Y., a corporation of New York Application October 29, 1951, Serial No. 253,721

4 Claims. (Cl. 198—24)

This invention relates to a device for feeding articles and more particularly to a device for automatically feeding cylindrical blocks successively onto successive holders positioned therebeneath.

It is an object of the present invention to provide an efficient and effective device of relatively simple construction for feeding articles.

In accordance with one embodiment of the invention successive ones of a column of articles are guided downwardly through a stationary tube by gravity and directed horizontally by the end portion of the stationary tube into the bore of a vertically disposed feed tube which is moved vertically toward and away from successive holders indexed into loading position therebeneath to guide the articles onto the holders. A weighted arm pivoted on the feed tube extends into the passageway thereof to yieldably support an article thereon as the feed tube is moved toward the holder and a rod movable in the feed tube pushes the article downwardly off of the pivoted supporting arm onto the holder and also serves to prevent the movement of the articles in the stationary tube until the movable feed tube and pusher rod have returned to their normal upper positions.

Other objects and advantages of the invention will become apparent by reference to the following detailed description thereof when considered in conjunction with the accompanying drawings illustrating a preferred embodiment of the invention, in which Fig. 1 is a fragmentary elevational view of a portion of an article processing machine showing the feed device thereon;

Fig. 2 is a vertical sectional view taken on the line 2—2 of Fig. 1;

Fig. 3 is a vertical sectional view of a portion of the feed device taken on the line 3—3 of Fig. 2; and Fig. 4 is a fragmentary view similar to Fig. 3 showing the parts in changed positions.

Referring to the drawings, 10 indicates a feed table on which are mounted a plurality of holders 12 in spaced relation to each other, each holder having a recessed upper portion forming a seat for receiving the end portion of an article 15, which, as disclosed herein, is a hollow cylindrical porcelain block.

The feed device for feeding successive blocks 15 into successive holders 12 comprises a vertically disposed relatively short feed tube 18, having a cylindrical bore 19 forming a guideway for guiding the blocks 15 therethrough onto the holders 12. The feed tube 18 is secured to an arm 20 fixed to the upper end of a hollow shaft or sleeve 21 which is mounted for vertical reciprocation in a bearing member 22 on a horizontal frame member 23 of the article processing machine.

At its lower end the sleeve 21 has a roller 27 rotatably mounted thereon which rides on the surface 28 of a lever 29 pivotally mounted at 30 on a supporting bracket 31. The lever 29 has a cam follower 32 engaging a cam 33 mounted on a shaft 34 which is rotated by any suitable drive means (not shown), which also indexes the feed table 10. A compression spring 35 encircling a stationary headed pin 36 stresses the arm 20 and the feed tube 18 downwardly and cooperates with the cam 33 to reciprocate the tube 18 to and from an upper position shown in Fig. 3 and a lower position shown in Fig. 4. The headed pin 36 fits in a clearance aperture in the arm 20 and is fixed to the bearing member 22. A resilient washer 37 encircling the pin 36 and supported on the bearing member 22 cushions the movement of the feed tube 18 as it reaches its lower position. In its lower position the feed tube 18 engages the top portion of the article holder 12 and the conical surface 76 of the feed tube serves to align the holder 12 with the article being fed.

A slot 40 is formed in the feed tube 18 and the arm 20 for receiving an article supporting member 41 which is pivotally supported on a pin 42, carried by the arm 20. A counter-weight 43 formed on the member 41 serves to urge the member for rotation in a counter-clockwise direction and the upper end of the slot 40 in the tube 18 serves to position an arm 44 of the member 41 horizontally within the passageway 19 of the feed tube 18. The arm 44 extending into the tube serves as a stop or platform for yieldably supporting an article 15 in the feed tube and upon the application of a downward force to the article 15, the arm 44 will be rocked about the pivot 42 out of the passageway 19, permitting free downward movement of the article.

Successive blocks or articles 15 are advanced into alignment with the upper end of the feed tube 18 by gravity through a stationary guideway 52 having a horizontal portion 53 formed in a stationary block 54 and having a portion 55 extending upwardly and formed by a stationary tube 56. The block 54 has a laterally and downwardly extending portion 57 which is fixed to the bearing bracket 22 to support the block 54 against movement. Supplied to the stationary gravity feed tube 55 in predetermined oriented relation by any suitable means, the cylindrical articles 55 form a column of articles which urge the articles in the leading end of the column forward horizontally with the axis of the cylindrical articles disposed vertically. The articles 15 are advanced in the portion 53 of the guideway 52 at a level slightly above an upper edge portion 58 of the tube 18 when the tube 18 is in its up position (Fig. 3). A portion 59 of the feed tube 18 of substantially semi-circular cross-section is extended upwardly above the portion 57 to serve as a stop for aligning the end article 15 of the row of articles with the bores 19 of the feed tube. The cut away portion of the feed tube 18 above the top edge portion 58 forms in effect a side opening or entrance for the movement of the articles 15 into the bore 19 of the feed tube 18.

A plunger or push rod 62 vertically disposed for movement in a bore 63 in the arm 54 and in the bore 19 of the feed tube 18 is provided for pushing the article 15 off of the pivoted arm 44 to feed it onto the holder 12 therebeneath. At its upper end the rod 62 is secured to a cross arm 63 which is fixed to the upper end of a rod 64 slidably mounted in the sleeve 21. At its lower end the rod 64 has a roller 65 which engages the flat surface 66 of a lever 67 pivotally mounted for oscillation about the pin 30. The lever 67 has a cam follower 68 thereon which rides on a cam 69 fixed to a shaft 34 so that as the cam 69 rotates, upward movement is imparted to the plunger 62, and a spring 70 connected to the lower end of the rod 64 serves to move the plunger 62 downwardly in cooperation with the action of the cam 69. In its normal upper position the lower end of the rod 62 is disposed above the horizontal portion of the guideway 54 and the articles 15 therein. A sloping surface 74 on the lower end of the rod 62 permits the rod to move the first article 15 in the horizontal row downwardly without interference from the second article in the row and the rod 62, as it moves down, serves to hold the second article and the row of articles from advance movement until the rod 62 has returned to its upper position. An adjustable stop 75 on the arm 63 is engageable with the stationary bracket 54 to limit the downward movement of the plunger 62.

In the operation of the device the feed tube 18 and the rod 62 move to their upper position as shown in Fig. 3 and the row of articles 15 are advanced to move the first article into the bore of the feed tube 18. The actuating mechanism under control of the cams 33 and 69 then causes the feed tube 18 and the plunger 62 to move downwardly together until the feed tube 18 has reached its lower position and the conical lower surface 76 thereon has engaged the upper end of the article holder 12 and centered the holder. During the downward movement of the feed tube 18 and the plunger 62, the end of the plunger engages the upper end of the first article in the row of articles and pushes it downwardly and the sloping surface 74 of the plunger engages the side of the second article 15 and prevents the forward movement of the row of articles. After the feed tube 18 has reached its lower position and comes to rest on the holder 12, the plunger 62 continues its downward movement and pushes the article 15 in the feed tube 18 downwardly against the action of the pivoted counter-weighted member 41, causing the arm 44 thereof to be rocked out of the bore 19 of the feed tube. The plunger 62 continues its movement downwardly past the member 41 into close proximity to the holder 12 as shown in Fig. 4 and is held at its lower position while the feed tube 18 is moved upwardly to insure that the article 15 is disengaged from the feed tube 18 after which the plunger 62 is returned to its normal upper position. During the upward movement of the tube 18 and the rod 62, the counter-weighted member 42 is returned to its normal position and on completion of the upward movement of the plunger 62 the row of articles 10 is again moved forwardly to position the first article of the row of articles in alignment with the passageway 19 of the feed tube 18.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for feeding articles comprising a feed member mounted for reciprocation to and from upper and lower positions and having a passageway therein for guiding articles therethrough onto a holder positioned below said member and in close proximity thereto at said lower position, a holding element, means mounting said holding element for movement transversely of the movement of said feed member into and out of the passageway therein and for yieldably retaining said holding member in a normal position in the passageway, means forming a stationary guideway for directing a row of said articles for movement transversely of the movement of said feed member and into the passageway thereof at a point above said supporting element, a plunger mounted for movement in the passageway in said feed member and having a normal upper position disposed above the position at which the articles are directed into the passageway in said feed member, said plunger having an end portion engageable with the first article in said passageway and having a side portion engageable with the second article of said row of articles for preventing feeding movement of said second article during the movement of said plunger from said upper position, and means for actuating said feed member and said plunger in timed relation to each other to effect the movement of said feed member into close proximity to said holder and the movement therewith of an article supported on said holding element and to cause movement of the plunger to force the article past the yieldable holding element onto said holder.

2. A device for feeding articles comprising a feed member mounted for reciprocation to and from upper and lower positions and having a substantially vertical passageway therein for guiding articles therethrough onto a holder positioned below said member and in close proximity thereto at said lower position, a holding element, means mounting said holding element on said feed member for movement transversely thereof into and out of said passageway therein, means for yieldably retaining said holding member in a normal position within the passageway in said feed member for supporting an article thereon, means forming a stationary guideway for directing said articles for movement transversely of the movement of said feed member into the passageway thereof at a point above said holding element, a plunger mounted for movement in the passageway in said feed member and having a normal upper position disposed above the articles directed into the passageway in said feed member, and means for actuating said feed member and said plunger in timed relation to each other to cause the downward movement thereof to effect the movement of said feed member into close proximity to said holder and the movement therewith of the article supported on said holding element and to cause movement of the plunger to force the article past the yieldable holding element onto said holder and also to cause said feed member to move upwardly while said plunger remains at its lower position to cause the disengagement of said article from said feed member.

3. A device for feeding articles comprising a movable feed tube having a passageway for guiding a part therethrough and movable to and from an upper position and a lower position in engagement with a holder for said parts, a counter-balanced arm pivoted on said feed tube for movement therewith and having a portion thereof normally positioned in said passageway to form a seat for supporting a part thereon, gravity feed means including a stationary passageway for guiding a row of articles for horizontal movement and directing the articles in said row successively into alignment with said feed tube, means for moving said feed tube to and from said upper and said lower positions, a plunger movable in said feed tube and having a normal position above the row of horizontally disposed parts, and means for reciprocating said plunger in timed relation to the movement of said feed tube to cause the plunger to move downwardly with said feed tube and prevent the advancement of the remainder of said row of articles and to move relative to the feed tube after said feed tube has reached its lower position to push the article within the feed tube past the pivoted arm and cause it to be deposited on the holder.

4. A device for feeding articles onto holders movable successively into a loading station comprising guide means having a guideway therein disposed transversely to a vertical axis through said loading station for guiding a row of articles successively into alignment with said axis, a tubular feed member mounted for movement along said axis and having a passageway for receiving the first article of said row of articles and for guiding said article for movement therethrough, means for moving said tubular feed member to and from an upper position for receiving successive ones of said row of articles and a lower position in close proximity to the holder at said loading station, a counter-balanced arm pivoted on said tubular feed member for movement therewith and having a portion thereof normally positioned in said passageway for yieldably supporting an article thereon for vertical movement therewith, said arm being disposed beneath the path of movement of said articles in said guideway for receiving said first article of said row of articles thereon, a plunger mounted above the path of movement of said row of articles for vertical movement in said tubular feed member for pushing the article in said tubular feed member past said pivoted arm onto the holder when said tubular feed member is in said lower position, said plunger also having a portion thereof engageable with the second article in said row of articles for preventing the feeding movement of said row of articles during the movement of said plunger from said upper position, and means for moving said plunger in timed relation to the movement of said tubular feed member.

References Cited in the file of this patent

UNITED STATES PATENTS

| | | |
|---|---|---|
| 334,898 | Rogers | Jan. 26, 1886 |
| 1,433,328 | Wright | Oct. 24, 1922 |